United States Patent [19]

Behnke et al.

[11] 4,232,925
[45] Nov. 11, 1980

[54] HIGH-VOLTAGE THREE PHASE ELECTRICAL SWITCH GEAR

[75] Inventors: Reinhold Behnke, Mannheim; Wolfgang Wagenbach, Oftersheim; Erwin Müller, Karlstein, all of Fed. Rep. of Germany

[73] Assignee: BBC Brown, Boveri & Company, Limited, Baden, Switzerland

[21] Appl. No.: 970,311

[22] Filed: Dec. 18, 1978

[30] Foreign Application Priority Data

Dec. 16, 1977 [DE] Fed. Rep. of Germany ... 7738424[U]

[51] Int. Cl.³ .................. H01R 29/00; H02B 1/10
[52] U.S. Cl. .................................. 339/31 R; 174/86
[58] Field of Search ............... 339/31 R, 31 M, 32 R, 339/32 M, 33, 136 R, 136 M, 139 R, 139 M, 195 R, 195 A, 195 M, 278 M; 174/86; 361/335-342

[56] References Cited

U.S. PATENT DOCUMENTS 3,701,929  10/1972  Taguchi et al. ............... 174/72 B

FOREIGN PATENT DOCUMENTS 187127  10/1922  United Kingdom ............... 339/195 A Primary Examiner—Neil Abrams
Attorney, Agent, or Firm—Burns, Doane, Swecker & Mathis

[57] ABSTRACT

A right angle connection for an SF$_6$-insulated high-voltage switch gear with three phase conductors is disclosed. The conductors are arranged in the connection with a straight section and an adjustable crank section. The crank section is adjustable between two positions 180° apart, so that the connection can be used in either direction.

6 Claims, 3 Drawing Figures

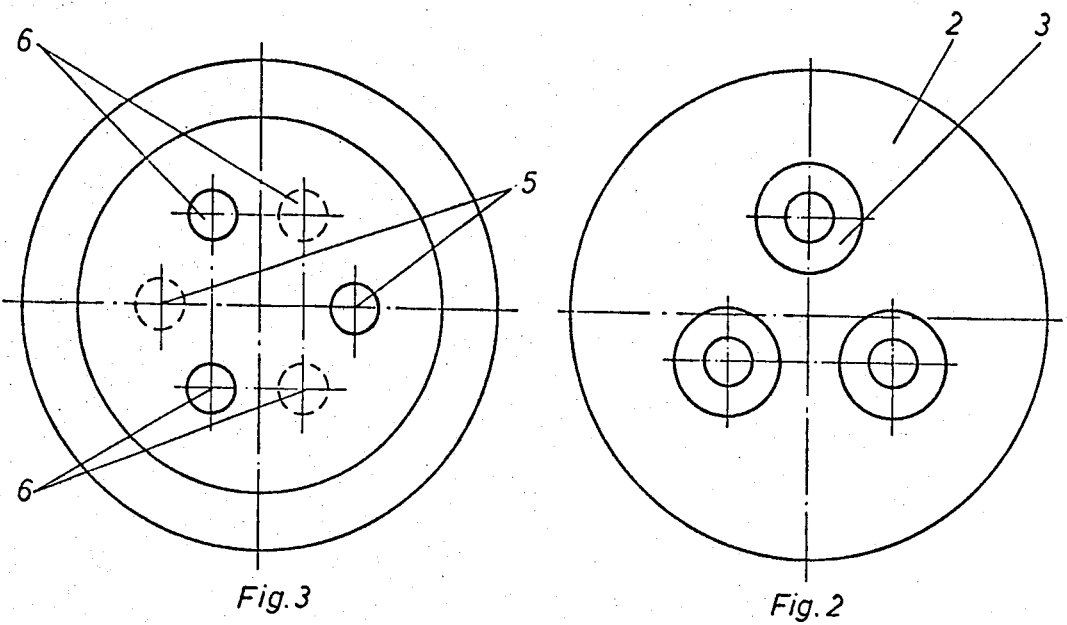
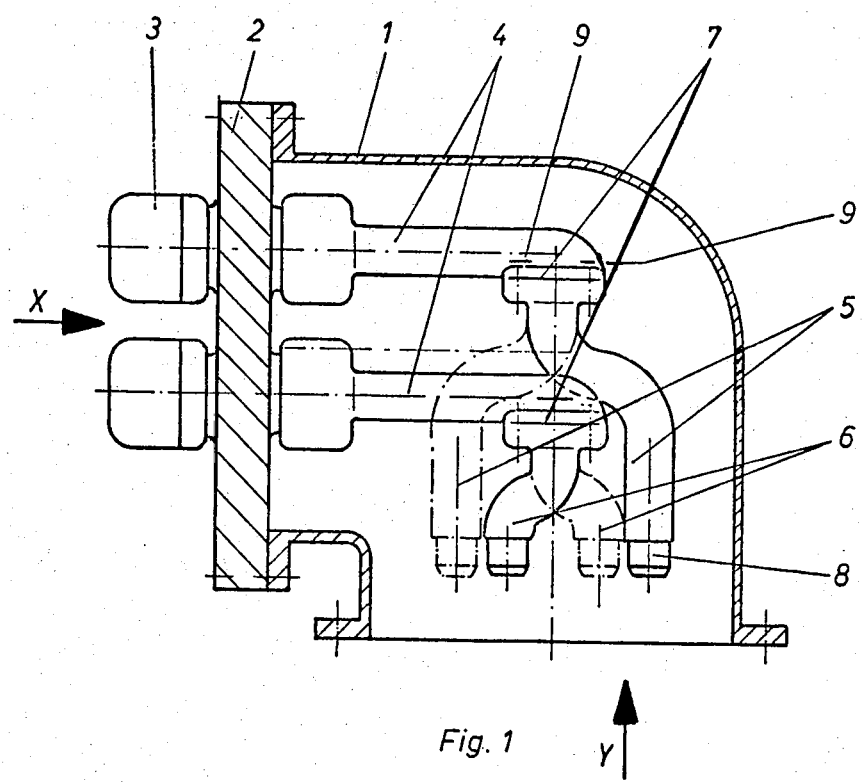
Fig. 3
Fig. 2
Fig. 1

HIGH-VOLTAGE THREE PHASE ELECTRICAL SWITCH GEAR

BACKGROUND OF THE INVENTION

This invention relates to high-voltage electrical switch gear, and more particularly to a right angle joint for three phase conductors which are encased and gased insulated.

Metalclad $SF_6$ switch gear has been used in high-voltage electric power transmission systems. The conductors are supported within metal tubes and the interior of the tubes are filled with $SF_6$ gas. Due to its excellent insulating properties, $SF_6$-insulated switch gear units require only about 10% of the volume of space that is needed by conventional switch gear units. For this reason, they are particularly suitable for use in areas of high electric energy requirements, such as high population density areas in cities and industrial centers. Previously, each phase of $SF_6$-insulated high-voltage switch gear units were encased in metalcladding indvidually, except for the bus. In the course of further development, with the objective of attaining still more compact switch gear units the three phase conductors have been encased together in a single metalclad tube. High-voltage switch gear units are formed by a variety of components in order to accomplish the various electric switching modes, such as ring bus bar switching. In some instances, it is necessary to turn the phase conductor system in one switch gear section by 180°. This has been done previously by bending the phase conductor as required. The result is that the shape of the conductors at the bend become very involved, with each phase conductor having a differently shaped curve. As a result, such $SF_6$-insulated high-voltage switch gear units are relatively costly.

It is an object of this invention to provide $SF_6$-insulated high-voltage switch gear which is capable of turning the phase conductor system in a right angle bend in either direction.

SUMMARY OF THE INVENTION

In accordance with this invention, the phase conductors in a right angle connection of three phase conductors each have one straight section and one cranked section and means joining the two sections together. The straight sections are spaced apart in a triangular arrangement. The cranked sections may be joined to the straight sections in either of two positions that are 180° C. apart, thereby allowing the phase conductors to be turned in a right angle in either direction.

DESCRIPTION OF THE DRAWINGS

A preferred embodiment of the invention is illustrated in the accompanying drawings in which:

FIG. 1 is a cross-sectional view of a right angle connection of an $SF_6$-insulated high-voltage switch gear in accordance with this invention;

FIG. 2 is an elevational view of the connection as viewed in the direction of the arrow marked X in FIG. 1; and FIG. 3 is an elevational view of the connection as viewed in the direction of the arrow marked Y in FIG. 1.

DESCRIPTION OF THE PREFERRED EMBODIMENT

A tubular right angle connecting piece or elbow of an $SF_6$-insulated high-voltage switch gear is shown in FIG. 1 with all three phase conductors enclosed together by a case 1 formed of light metal. The two ends of the elbow are shaped in the form of flanges, with one end closed off by means of an insulator 2 in the form of a disc. The phase conductors are mounted in the insulator 2 equally spaced from each other and arranged in the form of an equilateral triangle, as shown in FIG. 2. The phase conductors on the outside of the insulator 2 are in the form of plug contacts 3. On the inside of the insulator 2, the phase conductors are in the form of a substantially straight section 4. The upper straight conductor 4, as shown in FIG. 1 is connected with a crank section 5 by means of a flange joint 7. The flange joint 7 allows the crank section 5 to be secured to the straight section 4 either in the position shown in full lines in FIG. 1 or the position shown in phantom lines, which is displaced 180° from the first position. The two lower straight sections 4 are connected with short crank sections 6 by a flange connection 7 of the same type as described with respect to the crank section 5. The flange connections 7 are secured together by means of bolts 9 shown schematically in FIG. 1. The lower end of each crank section includes a plug contact 8 to simplify their connection with the phase conductors.

Referring to FIG. 3, the positions of the crank sections 5, 6 that are shown in full lines correspond to the full line positions shown in FIG. 1. The positions shown in dotted lines in FIG. 3 correspond to the positions shown in phantom lines in FIG. 1. By adjusting the positions of the crank section, the right angle connection of this invention is adjustable for use as a right angle connection in either direction.

While this invention has been illustrated and described in accordance with a preferred embodiment, it is recognized that variations and changes may be made therein without departing from the invention as set forth in the claims.

What is claimed is:

1. An insulated high-voltage right angle connection comprising:
   (a) three phase conductors;
   (b) casing means arranged in a right angle bend and surrounding said phase conductors;
   (c) insulation means supporting said phase conductors at the corners of an equilateral triangle;
   (d) said phase conductors each including a straight section and a crank section, and means joining said sections to allow selectively positioning said crank sections at either of two positions 180° apart to enable the high-voltage right angle connection to be connected to a mating connector in either of two positions of the right angle connection which are 180° apart.

2. The high-voltage connection according to claim 1 wherein said means for joining said sections includes a flange between said sections.

3. The high-voltage connection according to claim 1 wherein said straight sections of each phase conductor are of the same length.

4. The high-voltage connection according to claim 1 wherein two of said crank sections have substantially the same length and one of said crank sections has a greater length.

5. The high-voltage connection according to claim 1 wherein said crank sections have plug contacts for connection with phase conductors.

6. An insulated high-voltage right angle connector comprising:

three phase conductors each including a straight section, a crank section having first and second ends, and means for joining said first end of the crank section to said straight section;

casing means arranged in a right angle bend and surrounding said phase conductors; and insulator means supporting said phase conductors at the corners of an equilateral triangle;

wherein said joining means allows said crank section to be selectively positioned at either of two positions 180° apart; and wherein said second ends of the crank sections are located at the corners of substantially the same equilateral triangle in either of said two positions.

* * * * *